United States Patent [19]
Ishikawa et al.

[11] Patent Number: 5,172,790
[45] Date of Patent: Dec. 22, 1992

[54] BODY SIDE MOUNTED AIR BAG CONTROL SYSTEM

[75] Inventors: Toshihiro Ishikawa; Toshihiro Hara, both of Hiroshima; Haruhisa Kore, Kure; Kazuhiro Murashige, Aosakihigashi, all of Japan

[73] Assignee: Mazda Motor Corporation, Hiroshima, Japan

[21] Appl. No.: 714,714

[22] Filed: Jun. 13, 1991

[30] Foreign Application Priority Data

Jun. 13, 1989 [JP] Japan .................................. 2-154882

[51] Int. Cl.⁵ .......................................... B60R 21/22
[52] U.S. Cl. .................................... 180/268; 180/273; 280/730; 280/735
[58] Field of Search ....................... 280/730, 735, 728; 180/268, 273, 282; 307/10.1

[56] References Cited

U.S. PATENT DOCUMENTS

| | | | |
|---|---|---|---|
| 3,768,832 | 10/1973 | Schmidt | 280/735 |
| 3,884,497 | 5/1975 | Massengill | 280/730 |
| 3,981,520 | 9/1976 | Pulling | 280/730 |
| 4,620,721 | 11/1986 | Scholz et al. | 180/268 |
| 4,804,859 | 2/1989 | Swart | 307/10.1 |
| 4,845,377 | 7/1989 | Swart | 307/10.1 |
| 4,966,388 | 10/1990 | Warner et al. | 280/730 |
| 5,072,966 | 12/1991 | Nishitake et al. | 280/730 |

FOREIGN PATENT DOCUMENTS

2516185 10/1975 Fed. Rep. of Germany ...... 280/730
1-117957 8/1989 Japan .

Primary Examiner—Karin L. Tyson

[57] ABSTRACT

In an energy absorbing apparatus for a vehicle body, when a shock sensing output signal is obtained from one of first and second shock sensors a control unit operates one or both of first and second bag inflators in accordance with an operation mode according to the seating states of passengers represented by a sensing output signal obtained from seating state sensors, and the use states of the seat belts represented by a sensing output signal obtained from belt use state sensors so as to inflate one or both of first and second energy absorbing bags in accordance with the seating states of passengers and the use states of the seat belts.

8 Claims, 6 Drawing Sheets

BODY SIDE MOUNTED AIR BAG CONTROL SYSTEM

BACKGROUND OF THE INVENTION

The present invention relates to an energy absorbing apparatus for a vehicle body side portion, for, when a relatively large external shock is applied to a vehicle body side portion, absorbing the shock energy to protect passengers in a passenger room.

In recent years, the following proposal has been made. That is, a vehicle comprises energy absorbing bags, called air bags, which are normally set in a folded state. When a relatively large shock is applied to a vehicle body in a side collision state, the energy absorbing bag is quickly inflated, and the shock energy is absorbed by the inflated energy absorbing bag, thereby reducing the influence of the shock acting on passengers in a passenger room, and protecting the passengers.

In a vehicle having energy absorbing bags, for example, as disclosed in Japanese Utility Model Laid-Open No. 1-117957, a folded energy absorbing bag is stored in an armrest portion arranged on the passenger room side of a door forming a vehicle body side portion. The armrest portion also stores an inert gas generating agent, and an ignition device for causing the inert gas generating agent to generate the inert gas. Furthermore, a shock sensor for sensing a relatively large shock applied to a side sill is arranged in the side sill of the vehicle body, which is located under the door.

When the shock sensor generates a shock sensing output, the ignition device is operated in response to the sensing output, and causes the inert gas generating agent to generate the inert gas. The inert gas generated in this manner is quickly fed into the folded energy absorbing bag. As a result, the energy absorbing bag is inflated into the passenger room while breaking a thin portion formed in the armrest.

In this manner, in a vehicle having energy absorbing bags in vehicle body side portions, for example, when a shock caused by a side collision (a collision to a side portion of a given vehicle by, e.g., another vehicle) is applied to a vehicle body side portion, the energy absorbing bag is instantaneously inflated into the passenger room, and is interposed between the vehicle body side portion, e.g., a door, and a passenger seated inside the door. The shock energy caused by the shock applied to the vehicle body side portion is absorbed by the inflated energy absorbing bag, and a shock force acting sideways on the passenger can be reduced, thereby protecting the passenger.

In order to reduce a shock applied from the inflated energy absorbing bag to a passenger who collides against the inflated energy absorbing bag, the energy absorbing bag is normally formed with a plurality of degassing holes. Upon completion of inflation, the gas filled in the bag is degassed from the degassing holes, and the energy absorbing bag is immediately deflated.

A plurality of seats, i.e., front seats are normally aligned in the right-and-left direction, i.e., the widthwise direction of a vehicle body in a front portion in a passenger room of a conventional vehicle. In general, seat belts are equipped on the seats. It is desired in terms of safety that passengers who are seated on the front seats wear the seat belts, and the law states passengers must wear seat belts. However, in practice, passengers who are seated on the front seat do not always wear seat belts.

Therefore, a vehicle travels or is stopped under various different seating conditions of passengers on a plurality of seats arranged in the right-and-left direction in a passenger room, and various different use conditions of seat belts equipped on the seats.

For example, seating conditions of passengers, and use conditions of the seat belts of a driver's seat and a front passenger's seat arranged in the right-and-left direction in a front portion in a passenger room will be examined. In this case, the following eight conditions are possible:

① Passengers are seated on both the driver's and front passenger's seats, and they both wear the seat belts.
② Passengers are seated on both the driver's and front passenger's seats, and only a driver on the driver's seat wears the seat belt.
③ Passengers are seated on both the driver's and front passenger's seats, and only a passenger on the front passenger's seat wears the seat belt.
④ Passengers are seated on both the driver's and front passenger's seats, and neither of them wear the seat belts.
⑤ A person is seated on only the driver's seat, and he or she wears the seat belt.
⑥ A person is seated on only the driver's seat, and he or she does not wear the seat belt.
⑦ A passenger is seated on only the front passenger's seat, and he or she wears the seat belt.
⑧ A passenger is seated on only the front passenger's seat, and he or she does not wear the seat belt.

Therefore, in the vehicle equipped with the energy absorbing bags, if the energy absorbing bag is quickly inflated, and is interposed between the vehicle body side portion and a passenger regardless of seating conditions of passengers in the passenger room, and use conditions of the seat belts when a shock caused by a side collision is applied to the vehicle body side portion, the energy absorbing bag which need not be inflated is undesirably inflated depending on seating conditions of passengers in the passenger room, and use conditions of the seat belts. Nitrogen gas degassed from the inflate energy absorbing bags via the degassing holes undesirably increases a nitrogen gas concentration in the passenger room, thus posing a problem.

SUMMARY OF THE INVENTION

The present invention has been made in consideration of the above situation, and has as its object to provide an energy absorbing apparatus for a vehicle body side portion, which, when an external shock is applied to a vehicle body side portion, can avoid a situation that an energy absorbing bag which need not be inflated in terms of protection of passengers is inflated.

In order to achieve the above object, according to the first aspect of the present invention, there is provided an energy absorbing apparatus for a vehicle body side portion, which comprises first bag storage means arranged in a vehicle body left side portion on a passenger room side, and storing a folded first energy absorbing bag, first bag inflating means, arranged in the first bag storage means, for inflating the first energy absorbing bag, second bag storage means arranged in a vehicle body right side portion on the passenger room side, and storing a folded second energy absorbing bag, second bag inflating means, arranged in the second bag storage means, for inflating the second energy absorbing bag, first shock sensor means for sensing an external shock applied to the vehicle body left side portion, second shock sensor means for sensing an external shock applied to the vehicle body right side portion, seating state sensor means for sensing seating states of passengers on seats arranged in the passenger room, belt use state sensor means for sensing use states of seat belts equipped on the seats, and control means for controlling operations of the first and second bag inflating means. When a shock sensing output signal is obtained from one of the first and second shock sensor means, the control means operates one or both of the first and second bag inflating means in accordance with an operation mode according to the seating states of passengers represented by a sensing output signal obtained from the seating state sensor means, and the use states of the seat belts represented by a sensing output signal obtained from the belt use state sensor means so as to inflate one or both of the first and second energy absorbing bags in accordance with the seating states of passengers and the use states of the seat belts.

According to the second aspect of the present invention, there is provided an energy absorbing apparatus for a vehicle body side portion, which comprises, in addition to the constituting elements of the first aspect, third bag storage means arranged at a central portion in a right-and-left direction of the passenger room, and storing a folded third energy absorbing bag, and third bag inflating means, arranged in the third bag storage means, for inflating the third energy absorbing bag. When a shock sensing output signal is obtained from one of the first and second shock sensor means, the control means operates at least one of the first to third bag inflating means in accordance with an operation mode according to the seating states of passengers represented by a sensing output signal obtained from the seating state sensor means, and the use states of the seat belts represented by a sensing output signal obtained from the belt use state sensor means so as to inflate at least one of the first to third energy absorbing bags in accordance with the seating states of passengers and the use states of the seat belts.

In the energy absorbing apparatus for a vehicle body side portion according to the present invention with the above-mentioned arrangement, when a shock caused by, e.g., a side collision is applied to a vehicle body side portion, the control means senses a seating state of passengers on seats arranged in a passenger room, and a use state of seat belts equipped on the seats on the basis of a sensing output signal obtained from the seating state sensor means, and a sensing output signal obtained from the belt use state sensor means. The control means then selects the energy absorbing bag to be inflated, and sets an inflating mode for the energy absorbing bag to be inflated in accordance with the sensed seating state of passengers, and the sensed use state of the seat belts. The control means operates the bag inflating means of the selected energy absorbing bag in accordance with the set inflating mode. As a result, the energy absorbing bag is inflated in the passenger room in accordance with the seating state of passengers, and the use state of the seat belts.

Therefore, when an external shock is applied to the vehicle body side portion, the inflation state of the energy absorbing bag or bags suitable for a condition in the passenger room at that time can be obtained, and protection of passengers can be guaranteed. Furthermore, unnecessary operation noise generated by an energy absorbing bag which need not be inflated in terms of protection of passengers can be prevented, and an undesirable increase in nitrogen gas concentration in the passenger room caused by, e.g., nitrogen gas degassed from the energy absorbing bag which need not be inflated through degassing holes can also be prevented.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Figure 1:
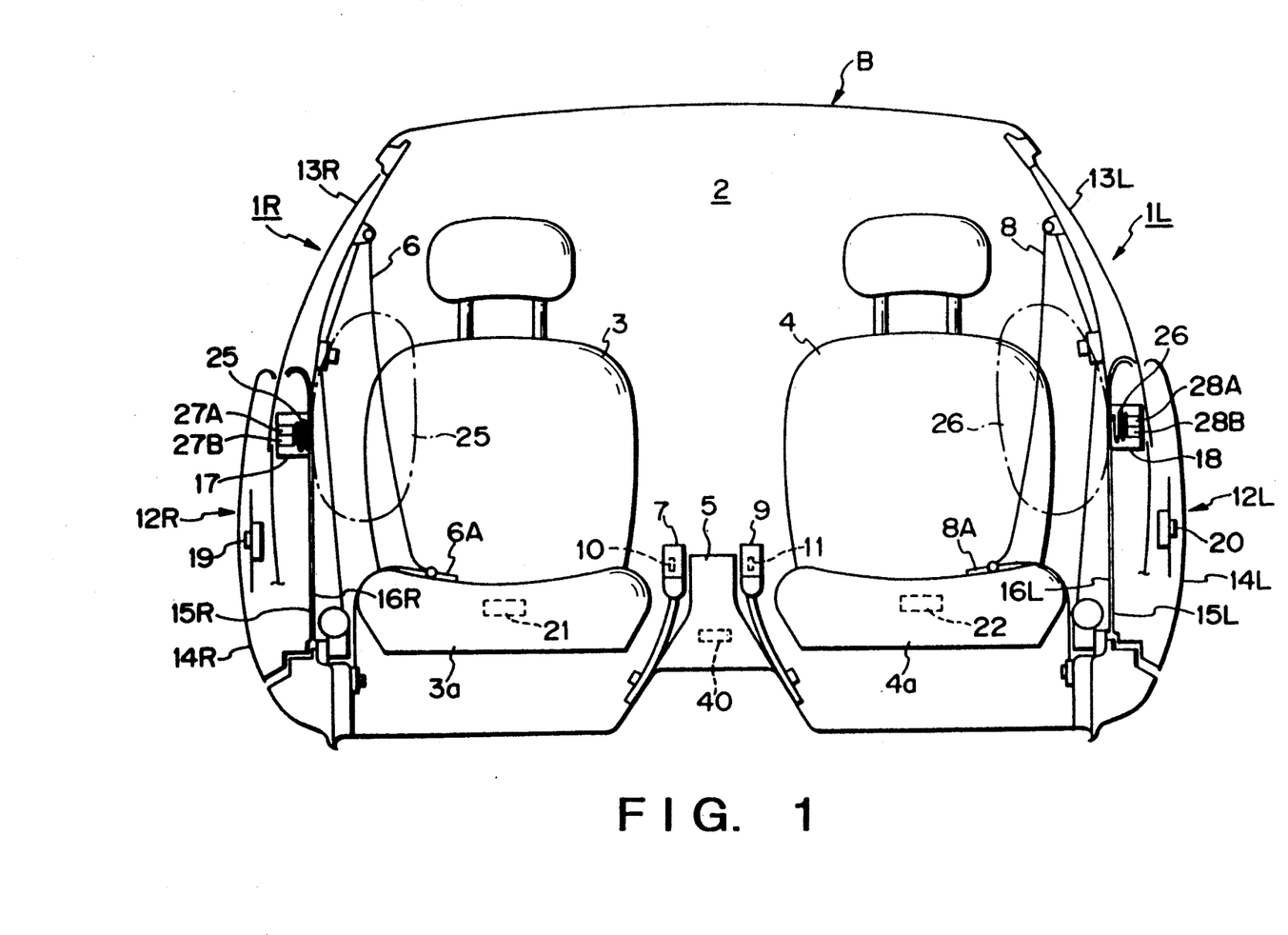
FIG. 1 is a schematic view showing door portions and a passenger room portion of a vehicle to which an embodiment of an energy absorbing apparatus for a vehicle body side portion according to the present invention is applied.

FIG. 1 is a schematic view showing door portions and a passenger room portion of a vehicle to which an embodiment of an energy absorbing apparatus for a vehicle body side portion according to the present invention is applied.

The vehicle shown in FIG. 1 has a symmetrical structure, and a vehicle body B comprises a right door 1R and a left door 1L constituting the right and left vehicle body side portions. In a passenger room 2, a right seat (i.e., a driver's seat) 3 and a left seat (i.e., a front passenger's seat) 4 are arranged near portions of the passenger room on the side of the right and left doors 1R and 1L. A center console box 5 extends in the back-and-forth direction of the vehicle body between the right and left seats 3 and 4. A seat belt 6 for restraining a passenger (i.e., a driver) seating on the right seat 3 is arranged on the right seat 3. On the other hand, a seat belt 8 for restraining a passenger's seating on the left seat 4 is arranged on the left seat 4.

A buckle 7 to be engaged with a coupling portion 6A of the seat belt 6 when the seat belt 6 provided to the right seat 3 is used, and a buckle 9 to be engaged with a coupling portion 8A of the seat belt 8 when the seat belt 8 provided to the left seat 4 is used are arranged on two side portions of the center console box 5. The right buckle 7 incorporates a belt lock sensor 10 for sensing an engaging state between the coupling portion 6A of the seat belt 6 and the buckle 7. The left buckle 9 incorporates a belt lock sensor 11 for sensing an engaging state between the coupling portion 8A of the seat belt 8, and the buckle 9. The two belt lock sensors 10 and 11 constitute a belt use state sensing mechanism for sensing whether or not a passenger who is seated on the right seat 3 wears the seat belt 6, and for sensing whether or not a passenger who is seated on the left seat 4 wears the seat belt 8.

The structure of the right and left doors 1R and 1L will be described below.

The doors 1R and 1L respectively comprise door panels 12R and 12L, and door glasses 13R and 13L. The door panels 12R and 12L are respectively constituted by door outer panels 14R and 14L arranged on the outer side of the vehicle body, and door inner panels 15R and 15L arranged on the passenger room 2 side. Door trims 16R and 16L are attached to the door inner panels 15R and 15L on their passenger room 2 side, respectively.

A bag storage portion 17 is mounted on a portion of the right door 1R on the passenger room side to be located aside the upper body portion of a passenger who is seated on the right seat 3. More specifically, the bag storage portion 17 is mounted on the outer surface of the door inner panel 15R, and is covered by the door trim 16R. The bag storage portion 17 stores a folded energy absorbing bag 25, and two upper and lower inflators 27A and 27B which are operated to inflate the energy absorbing bag 25. A plurality of gas introduction ports 36R (FIG. 2) are attached to the proximal end portion of the energy absorbing bag 25. A bag storage portion 18 is mounted on a portion of the left door 1L on the passenger room side to be located aside the upper body portion of a passenger who is seated on the left seat 4. More specifically, the bag storage portion 18 is mounted on the outer surface of the door inner panel 15L, and is covered by the door trim 16L. The bag storage portion 18 stores a folded energy absorbing bag 26, and two upper and lower inflators 28A and 28B which are operated to inflate the energy absorbing bag 26. A plurality of gas introduction ports 36L (FIG. 2) are attached to the proximal end portion of the energy absorbing bag 26.

The bag storage portions 17 and 18 arranged on the right and left doors 1R and 1L will be described below. These bag storage portions have the same arrangement. Therefore, in the following description, the right bag storage portion 17 will be described in detail, and the left bag storage portion 18 will be briefly described.

Figure 2:
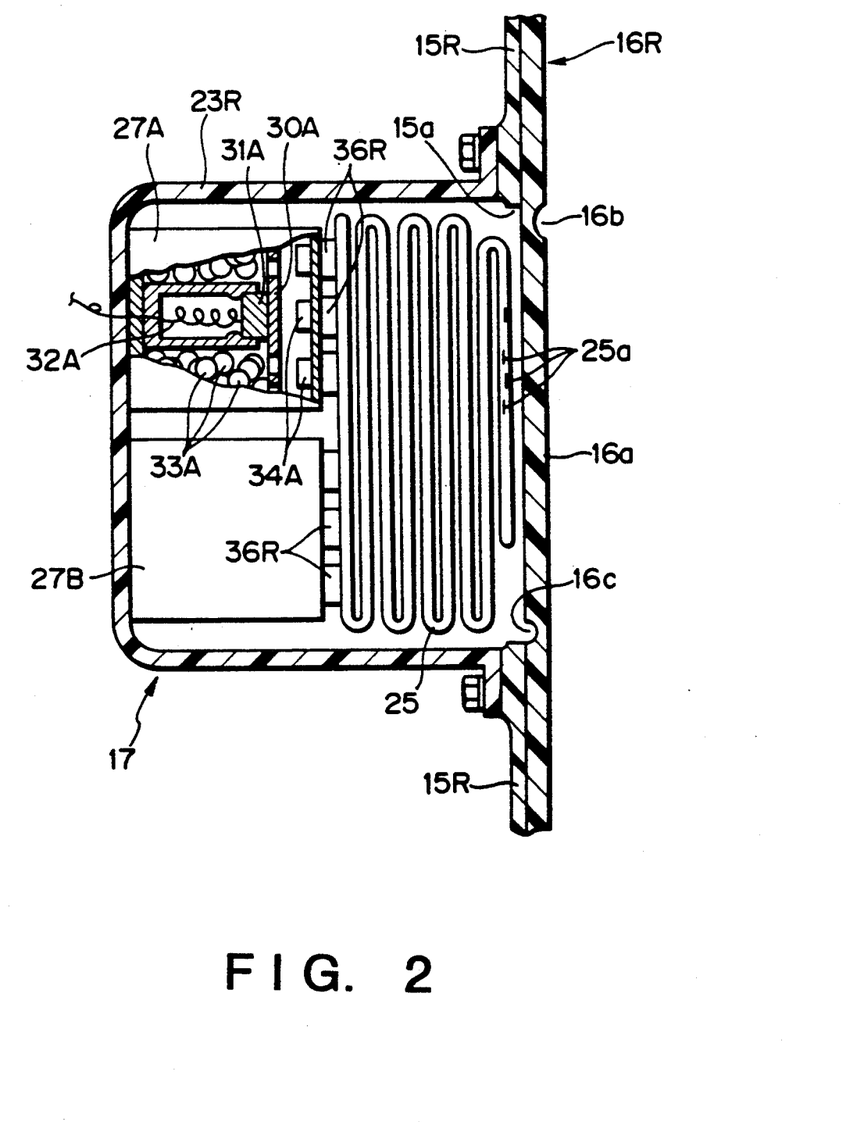
FIG. 2 is a longitudinal sectional view showing an internal structure of a right bag storage means of the energy absorbing apparatus shown in FIG. 1.

As shown in FIG. 2, the right bag storage portion 17 has a cap-like case 23R attached to the inner surface side of the door inner panel 15R. An opening 15a is formed in a portion of the door inner panel 15R where the case 15R is attached. The case 23R is fixed to a portion around the opening 15a of the door inner panel 15R by fastening bolts. The opening 15a of the door inner panel 15R is closed by a closing portion 16a provided to the door trim 16R.

The closing portion 16a of the door trim 16R is enclosed by a linearly extending hinge portion 16b, and a thin portion 16c which extends in a U shape with respect to the hinge portion 16b. In this manner, the closing portion 16a is partitioned from the remaining portion of the door trim 16R. The thin portion 16c has a mechanical strength enough to be broken by a relatively small tensile force. When an excessive force acts on the closing portion 16a, the closing portion 16a is broken along the U-shaped thin portion 16c, and is pivoted about the hinge portion 16b. As a result, the opening portion 15a of the door inner panel 15R is opened.

In the case 23R, the two inflators 27A and 27B are fixed to the upright inner surface of the case 23R to be vertically aligned. The inflators 27A and 27B have the same arrangement. FIG. 2 illustrates the inner structure of the upper inflator 27A. Note that symbol B is attached to reference numerals of components of the lower inflator 27B although some components are not shown in FIG. 2.

More specifically, the interior of the inflator 27A (or 27B) is partitioned into two rooms by a corresponding partition wall member 30A (or 30B) on which a large number of through holes are formed. One room partitioned by the partition wall member 30A (or 30B) stores an ignition agent 31A (or 31B), a heater 32A (or 32B) (FIG. 3) for igniting the ignition agent 31A (31B), and a gas generating agent 33A (or 33B) which is combusted when the ignition agent 31A (or 31B) is ignited, and generates a large amount of nitrogen gas. The other room partitioned by the partition wall member 30A (or 30B) stores a plurality of filter portions 34A (or 34B). The plurality of filter portions 34A and 34B are coupled to the plurality of gas introduction ports 36R arranged on the proximal end portion of the energy absorbing bag 25 folded between the two inflators 27A and 27B, and the corresponding closing portion 16a.

In this manner, in each of the inflators 27A and 27B, nitrogen gas generated in one room partitioned by the partition wall member 30A (and/or 30B) is introduced to the other room partitioned by the partition wall member 30A (and/or 30B), and is then introduced into the energy absorbing bag 25 via the plurality of filter portions 34A (and/or 34B) and the plurality of gas introduction ports 36R. Note that a plurality of degassing through holes 25a are formed on the distal end portion of the energy absorbing bag 25.

On the other hand, the left bag storage portion 18 has the same arrangement as the right bag storage portion 17. The left bag storage portion 18 will be briefly described below. The left bag storage portion 18 comprises a case 23L corresponding to the case 23R, and the case 23L stores the energy absorbing bag 26, and the two upper and lower inflators 28A and 28B corresponding to the energy absorbing bag 25 and the two inflators 27A and 27B in the bag storage portion 17. The two inflators 28A and 28B respectively have heaters 39A and 39B (FIG. 3) corresponding to the right heaters 32A and 32B.

Referring again to FIG. 1, a shock sensor 19 for sensing an external shock applied on the vehicle body right side portion including the right door 1R, and generating a shock sensing output signal is arranged inside the door outer panel 14R in the right door 1R. A shock sensor 20 for sensing an external shock applied to the vehicle body left side portion including the left door 1L, and generating a shock sensing output signal is arranged inside the door outer panel 14L in the left door 1L.

A weight sensor 21 for sensing a seating state of a passenger on the right seat 3 is embedded in a seating portion 3a of the right seat 3. A weight sensor 22 for sensing a seating state of a passenger on the left seat 4 is embedded in a seating portion 4a of the left seat 4. The weight sensor 21 senses a weight applied to the seating portion 3a by a passenger who is seated on the right seat 3. Similarly, the weight sensor 22 senses a weight applied to the seating portion 4a by a passenger who is seated on the left seat 4.

An inflator control unit 40 is arranged in the center console box 5 arranged between the right and left seats 3 and 4. The inflator control unit 40 is electrically connected to the above-mentioned belt lock sensors 10 and 11, the shock sensors 19 and 20, the weight sensors 21 and 22, the heaters 32A and 32B for the two inflators 27A and 27B in the bag storage portion 17, and the heaters 39A and 39B for the two inflators 28A and 28B in the bag storage portion 18.

Figure 3:
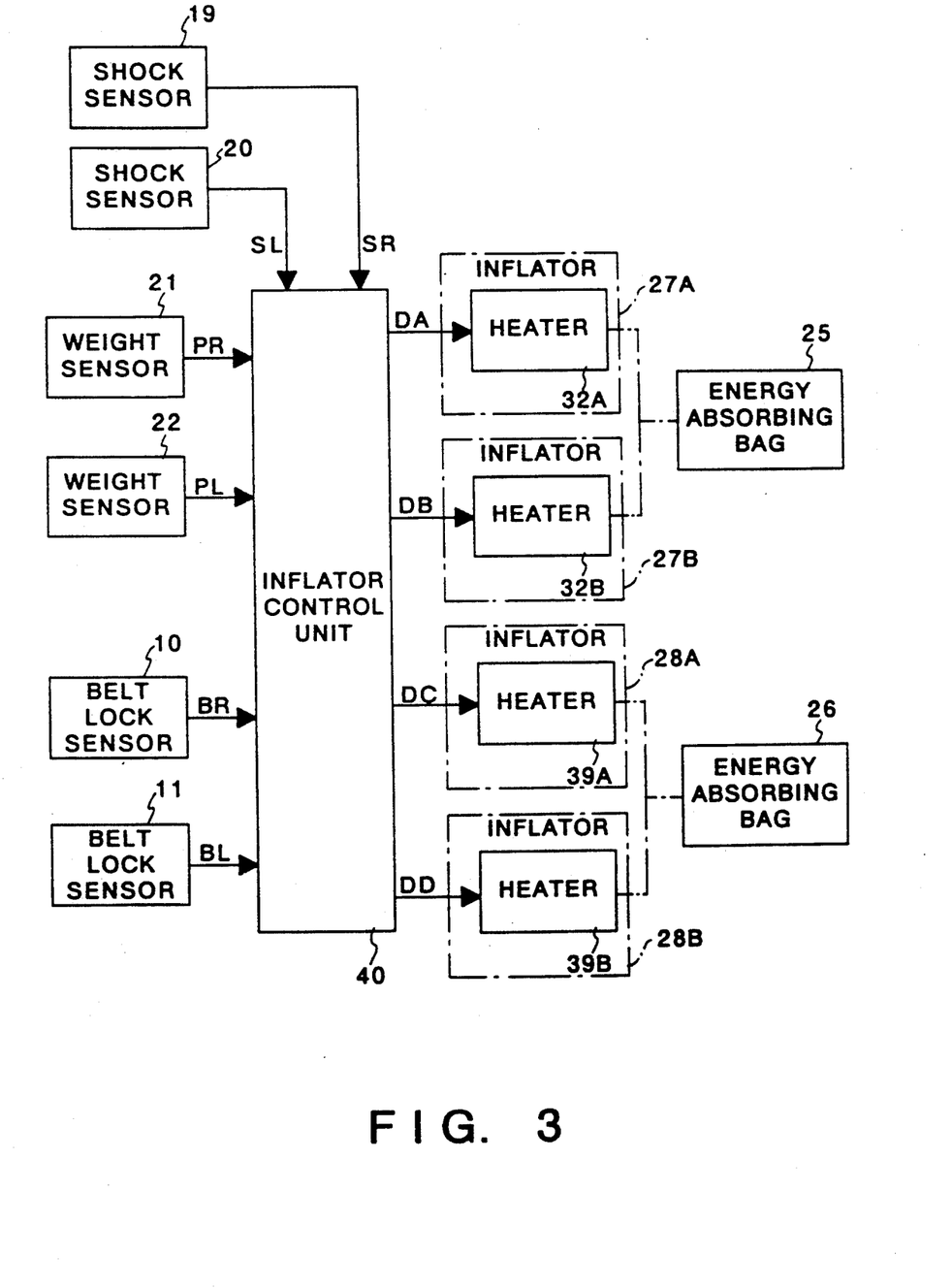
FIG. 3 is a block diagram showing electrical connections in the embodiment of the energy absorbing apparatus shown in FIG. 1.

As shown in FIG. 3, the inflator control unit 40 receives a shock sensing output signal SR from the shock sensor 19, a shock sensing output signal SL from the shock sensor 20, a sensing output signal PR output from the weight sensor 21 and representing a seating state of a passenger on the right seat 3, a sensing output signal PL output from the weight sensor 22 and representing a seating state of a passenger on the left seat 4, a sensing output signal BR output from the belt lock sensor 10, and representing a use state of the seat belt 6 by a passenger who is seated on the right seat 3, and a sensing output signal BL output from the belt lock sensor 11, and representing a user state of the seat belt 8 by a passenger who is seated on the left seat 4.

Upon reception of the shock sensing output signal SR or SL from the shock sensor 19 or 20, the inflator control unit 40 forms all or selected ones of a drive signal DA for the heater 32A of the inflator 27A in the bag storage portion 17, a drive signal DB for the heater 32B of the inflator 27B in the bag storage portion 17, a drive signal DC for the heater 39A of the inflator 28A in the bag storage portion 18, and a drive signal DD for the heater 39B of the inflator 28B in the bag storage portion 18 in accordance with the seating states of passengers on the right and left seats 3 and 4 sensed on the basis of the sensing output signals PR and PL from the weight sensors 21 and 22, and the use states of the seat belts 6 and 8 sensed on the basis of the sensing output signals BR and BL from the belt lock sensors 10 and 11, and supplies the formed signals to all or selected ones of the heater 32A of the inflator 27A, the heater 32B of the inflator 27B, the heater 39A of the inflator 28A, and the heater 39B of the inflator 28B.

In the inflators 27A and 27B in the right bag storage portion 17, when the drive signals DA and DB are supplied from the inflator control unit 40 to the corresponding heaters 32A and 32B, the heaters 32A and 32B instantaneously generate heat, thereby igniting the corresponding ignition agents 31A and 31B. Upon ignition of the ignition agents 31A and 31B, the corresponding gas generating agents 33A and 33B respectively stored in the inflators 27A and 27B are combusted, and generate a large amount of nitrogen gas. The large amount of nitrogen gas generated passes through the filter portions 34A and 34B respectively provided to the inflators 27A and 27B, and flows into the energy absorbing bag 25 via the plurality of gas introduction ports 36R. In this manner, the energy absorbing bag 25 is inflated.

Upon inflation, the energy absorbing bag 25 breaks the thin portion 16c to pivot upward the closing portion 16a of the door trim 16R, which portion closes the opening 15a formed in the door inner panel 15R, about the hinge portion 16b, thereby opening the opening 15a formed in the door inner panel 15R, as indicated by an alternate long and short dashed line in FIG. 1. The energy absorbing bag 25 is inflated toward the right seat 3 via the opening 15a.

In this case, when both the drive signals DA and DB are simultaneously supplied to the heaters 32A and 32B of the inflators 27A and 27B, the energy absorbing bag 25 is immediately inflated. In contrast to this, when the drive signal DA or DB is supplied to one of the heaters 32A and 32B of the inflators 27A and 27B, the energy absorbing bag 25 is relatively slowly inflated. More specifically, the full expansion timing of the energy absorbing bag 25 when one of the drive signals DA and DB is supplied is delayed from the full expansion timing of the energy absorbing bag 25 when both the drive signals DA and DB are supplied.

In the inflators 28A and 28B in the left bag storage portion 18, when the drive signals DC and DD are supplied from the inflator control unit 40 to the corresponding heaters 39A and 39B, the heaters 39A and 39B instantaneously generate heat. Upon this heat generation, the same operations as in the right inflators 27A and 27B are performed, and the energy absorbing bag 26 is inflated from the left door 1L toward the left seat 4, as indicated by an alternate long and short dashed line in FIG. 1.

In this case, when the drive signals DC and DD are simultaneously supplied to both the heaters 39A and 39B of the inflators 28A and 28B, the energy absorbing bag 26 is immediately inflated. In contrast to this, when the drive signal DC or DD is supplied to one of the heaters 39A and 39B of the inflators 28A and 28B, the energy absorbing bag 26 is inflated relatively slowly. More specifically, the full expansion timing of the energy absorbing bag 26 when one of the drive signals DC and DD is supplied is delayed from the full expansion timing of the energy absorbing bag 26 when both the drive signals DC and DD are supplied.

When the inflator control unit 40 supplies all or selected ones of the drive signals DA, DB, DC, and DD, the relationship among the seating states of passengers on the right and left seats 3 and 4, the use states of the seat belts 6 and 8 sensed on the basis of the sensing output signals from the belt lock sensors 10 and 11, and the drive signals DA, DB, DC, and DD to be supplied is set as shown in Table 1 assuming a case wherein a shock caused by a side collision is applied to the vehicle body right side portion including the right door 1R, and the shock sensing output signal SR is obtained from the shock sensor 19. When a shock caused by a side collision is applied to the vehicle body left side portion including the left door 1L, and the shock sensing output signal SL is obtained from the shock sensor 20, the above-mentioned relationship is set as shown in Table 2 below.

TABLE 1

| | (Shock on Vehicle Body Right Side Portion) | | | | | | | |
|---|---|---|---|---|---|---|---|---|
| Case | 1 | 2 | 3 | 4 | 5 | 6 | 7 | 8 |
| Right Seat 3 | Q | Q | Q | Q | Q | Q | E | E |
| Seat Belt 6 | N | U | N | U | N | U | N | N |
| Left Seat 4 | E | E | Q | Q | Q | Q | Q | Q |
| Seat Belt 8 | N | N | N | N | U | U | U | N |
| Drive Signal | | | | | | | | |
| DA | o | o | o | o | o | o | o | o |
| DB | o | o | o | o | o | o | o | o |
| DC | o | x | o | o | o | o | o | o |
| DD | o | x | o | x | x | x | x | x |

TABLE 2

| | (Shock on Vehicle Body Left Side Portion) | | | | | | | |
|---|---|---|---|---|---|---|---|---|
| Case | 1 | 2 | 3 | 4 | 5 | 6 | 7 | 8 |
| Right Seat 3 | Q | Q | Q | Q | Q | Q | E | E |
| Seat Belt 6 | N | U | N | U | N | U | N | N |
| Left Seat 4 | E | E | Q | Q | Q | Q | Q | Q |
| Seat Belt 8 | N | N | N | N | U | U | U | N |

TABLE 2-continued

| | (Shock on Vehicle Body Left Side Portion) | | | | | | | |
|---|---|---|---|---|---|---|---|---|
| Case | 1 | 2 | 3 | 4 | 5 | 6 | 7 | 8 |
| Drive Signal | | | | | | | | |
| DA | o | o | o | o | o | o | x | o |
| DB | x | x | o | x | x | x | x | o |
| DC | o | o | o | o | o | o | o | o |
| DD | o | o | o | o | o | o | o | o |

(where symbol Q represents a state wherein a passenger is seated; E, a state wherein no passenger is seated; U, a state wherein the seat belt is used; N, a state wherein the seat belt is not used; o, a state wherein the drive signal is supplied; and x, a state wherein no drive signal is supplied)

According to Tables 1 and 2 above, the drive signals DA and DB are supplied to the heaters 32A and 32B of the inflators 27A and 27B, and the drive signals DC and DD are supplied to the heaters 39A and 39B of the inflators 28A and 28B. As a result, for example, if an external shock is applied to the vehicle body right side portion (i.e., Table 1) in a state wherein a passenger is seated on the right seat 3, and wears the seat belt 6, and no passenger is seated on the left seat 4 (i.e., Case 2), the energy absorbing bag 26 in the left bag storage portion 18 is inhibited from being inflated. If an external shock is applied to the vehicle body left side portion (i.e., Table 2) in a state wherein a passenger is seated on the left seat 4 and wears the seat belt 8, and no passenger is seated on the right seat 3 (i.e., Case 7), the energy absorbing bag 25 in the right bag storage portion 17 is inhibited from being inflated. More specifically, in this embodiment, the energy absorbing bag which need not be inflated can be prevented from being inflated.

The energy absorbing bags 25 and 26 in the bag storage portions 17 and 18 are inflated at appropriate inflation speeds in accordance with the seating states of passengers on the right and left seats 3 and 4, and the use states of the seat belts 6 and 8.

More specifically, two drive signals DA and DB or DC and DD are simultaneously supplied to the bag storage portion on a side where a side collision occurs, i.e., the right bag storage portion 17 when the side collision occurs on the vehicle body right side portion, or the left bag storage portion 18 when the side collision occurs on the vehicle body left side portion, and the corresponding inflators 27A and 27B or 28A and 28B simultaneously generate nitrogen gas to inflate the corresponding energy absorbing bag 25 or 26, so that the bag can be immediately fully expanded.

When a passenger who is seated on the side collision side does not wear the seat belt 6 or 8, and no passenger is seated on a side opposite to the side collision side (i.e., Case 1 in Table 1, and Case 8 in Table 2), the two drive signals DA and DB or DC and DD are simultaneously supplied to the bag storage portion 17 or 18 on the side opposite to the side collision side. In this manner, the corresponding inflators 27A and 27B or 28A and 28B simultaneously generate nitrogen gas to inflate the corresponding energy absorbing bag 25 or 26, so that the bag can be immediately fully expanded. When a passenger who is seated on the side collision side does not wear the seat belt 6 or 8, and a passenger who is seated on the side opposite to the side collision side does not wear the seat belt 6 or 8 (i.e., Case 3 in Table 1, and Case 3 in Table 2), the two drive signals DA and DB or DC and DD are simultaneously supplied to the bag storage portion 17 or 18 on the side opposite to the side collision side. In this manner, the corresponding inflators 27A and 27B or 28A and 28B simultaneously generate nitrogen gas to inflate the corresponding energy absorbing bag 25 or 26, so that the bag can be immediately fully expanded.

In the remaining cases (i.e., Cases 4 to 8 in Table 1, and Cases 1, 2, and 4 to 6 in Table 2), one drive signal DA or DC is supplied to the bag storage portion 17 or 18 on the side opposite to the side collision side. In this manner, only the corresponding inflator 27A or 28A generates nitrogen gas to inflate the corresponding energy absorbing bag 25 or 26, so that the bag can be fully expanded in a delayed state. The present invention is not limited to the arrangement of the above embodiment, and various changes and modifications may be made within the spirit and scope of the invention.

For example, in the above embodiment, the two drive signals DA and DB or DC and DD are simultaneously supplied to the bag storage portion on the side collision side in all the cases, and the corresponding inflators 27A and 27B or 28A and 28B simultaneously generate nitrogen gas to inflate the corresponding energy absorbing bag 25 or 26, so that the bag can be immediately fully expanded. However, the present invention is not limited to this arrangement, and may be arranged as shown in Tables 3 and 4 below as a modification.

TABLE 3

| | (Shock on Vehicle Body Right Side Portion) | | | | | | | |
|---|---|---|---|---|---|---|---|---|
| Case | 1 | 2 | 3 | 4 | 5 | 6 | 7 | 8 |
| Right Seat 3 | Q | Q | Q | Q | Q | Q | E | E |
| Seat Belt 6 | N | U | N | U | N | U | N | N |
| Left Seat 4 | E | E | Q | Q | Q | Q | Q | Q |
| Seat Belt 8 | N | N | N | N | U | U | U | N |
| Drive Signal | | | | | | | | |
| DA | o | o | o | o | o | o | x | o |
| DB | o | o | o | o | o | o | x | x |
| DC | o | x | o | o | o | o | o | o |
| DD | x | x | o | x | x | x | x | x |

TABLE 4

| | (Shock on Vehicle Body Left Side Portion) | | | | | | | |
|---|---|---|---|---|---|---|---|---|
| Case | 1 | 2 | 3 | 4 | 5 | 6 | 7 | 8 |
| Right Seat 3 | Q | Q | Q | Q | Q | Q | E | E |
| Seat Belt 6 | N | U | N | U | N | U | N | N |
| Left Seat 4 | E | E | Q | Q | Q | Q | Q | Q |
| Seat Belt 8 | N | N | N | N | U | U | U | N |
| Drive Signal | | | | | | | | |
| DA | o | o | o | o | o | o | x | o |
| DB | x | x | o | x | x | x | x | x |
| DC | o | x | o | o | o | o | o | o |
| DD | x | x | o | o | o | o | o | o |

Note that symbols used in Tables 3 and 4 have the same meanings as those used in Tables 1 and 2 above.

In this modification, when a collision occurs on the vehicle body right side portion, Cases 1, 7, and 8 are different from those in the above embodiment, as shown in Table 3.

More specifically, in the above embodiment, when a collision occurs on the vehicle body right side portion in a state wherein a passenger (i.e., a driver) is seated only on the right seat 3 and does not wear the seat belt 6, the four drive signals DA, DB, DC, and DD are simultaneously supplied. However, as shown in Case 1 in Table 1, the three drive signals DA, DB, and DC may be supplied. When the three drive signals are supplied in Case 1, the energy absorbing bag 25 is immediately fully expanded from the right bag storage portion 17 on the collision side, and the energy absorbing bag 26 is fully expanded from the left bag storage portion 18 on the side opposite to the collision side at a timing delayed from the full expansion timing of the energy absorbing bag 25.

As a result, the passenger (driver) who is seated on the right seat 3 on the collision side is immediately moved toward the right door 1R by the inertia upon the collision. In this case, he or she can be received by the energy absorbing bag 25 on the collision side, which is immediately fully expanded, and the shock energy can be reliably absorbed. After the driver is received by the energy absorbing bag 25, he or she is moved (returned) toward the left door 1L on the side opposite to the collision side by the counteraction. In this case, he or she can be received by the energy absorbing bag 26 on the side opposite to the collision side, which bag is fully expanded at a delayed timing, and the shock energy can be reliably absorbed, thus guaranteeing high safety.

In the above embodiment, when a collision occurs on the vehicle body right side portion in a state wherein a passenger is seated only on the left seat 4 and wears the seat belt 8, the three drive signals DA, DB, and DC are supplied. However, as shown in Case 7 in Table 3, only one drive signal DC may be supplied. When only one drive signal is supplied in Case 7, the energy absorbing bag 25 is not inflated from the right bag storage portion 17 on the collision side. Since the passenger who is seated on the left seat 4 wears the seat belt 8, he or she will not collide against the right door 1R, thus avoiding unnecessary expansion of the energy absorbing bag 25.

In the above embodiment, when a collision occurs on the vehicle body right side portion in a state wherein a passenger is seated only on the left seat 4 and does not wear the seat belt 8, the three drive signals DA, DB, and DC are supplied. As shown in Case 8 in Table 3, however, the two drive signals DA and DC may be supplied. When the two drive signals DA and DC are supplied in Case 7, the energy absorbing bag 25 is fully expanded from the right bag storage portion 17 on the collision side in a delayed state.

As a result, the passenger who is seated on the left seat 4 on the side opposite to the collision side is moved toward the right door 1R by the inertia upon the collision to cross the passenger room. In this case, he or she can be received by the energy absorbing bag 25 on the collision side, which is fully expanded at the delayed timing, and the shock energy can be reliably absorbed.

In this modification, when a collision occurs on the vehicle body left side portion, Cases 1, 2, and 8 are different from those in the above embodiment, as shown in Table 4.

More specifically, in the above embodiment, when a collision occurs on the vehicle body left side portion in a state wherein a passenger is seated only on the left seat 4 and does not wear the seat belt 8, the four drive signals DA, DB, DC, and DD are supplied. As shown in Case 8 in Table 4, however, the three drive signals DA, DC, and DD may be supplied. When the three drive signals are supplied in Case 8, the energy absorbing bag 26 is immediately fully expanded from the left bag storage portion 18 on the collision side, and the energy absorbing bag 25 is fully expanded from the right bag storage portion 17 on the side opposite to the collision side at a timing delayed from the full expansion timing of the energy absorbing bag 26.

As a result, the passenger who is seated on the left seat 4 on the collision side is immediately moved toward the left door 1L by the inertia upon the collision. In this case, he or she can be received by the energy absorbing bag 26 on the collision side, which is immediately fully expanded, and the shock energy can be reliably absorbed. After the passenger is received by the energy absorbing bag 26, he or she is moved (returned) toward the right door 1R on the side opposite to the collision side by the counteraction. In this case, he or she can be received by the energy absorbing bag 25 on the side opposite to the collision side, which is fully expanded at the delayed timing, and the shock energy can be reliably absorbed, thus guaranteeing high safety.

In the above embodiment, when a collision occurs on the vehicle body left side portion in a state wherein a passenger (driver) is seated only on the right seat 3 and wears the seat belt 6, the three drive signals DA, DC, and DD are supplied. However, as shown in Case 2 in Table 4, only one drive signal DA may be supplied. When only one drive signal is supplied in Case 2, the energy absorbing bag 26 is not inflated from the left bag storage portion 18 on the collision side. Since the driver who is seated on the right seat 3 wears the seat belt 6, he or she will not collide against the left door 1L, thus avoiding unnecessary expansion of the energy absorbing bag 26.

In the above embodiment, when a collision occurs on the vehicle body left side portion in a state wherein a passenger (driver) is seated only on the right seat 3 and does not wear the seat belt 6, the three drive signals DA, DC, and DD are supplied. As shown in Case 1 in Table 4, however, the two drive signals DA and DC may be supplied. When the two drive signals DA and DC are supplied in Case 1, the energy absorbing bag 26 is fully expanded from the left bag storage portion 18 on the collision side at a delayed timing.

As a result, the driver who is seated on the right seat 3 on the side opposite to the collision side is moved toward the left door 1L upon the collision to cross the passenger room. In this case, he or she can be received by the energy absorbing bag 26 on the collision side, which is fully expanded at the delayed timing, and the shock energy can be reliably absorbed.

Figure 4:
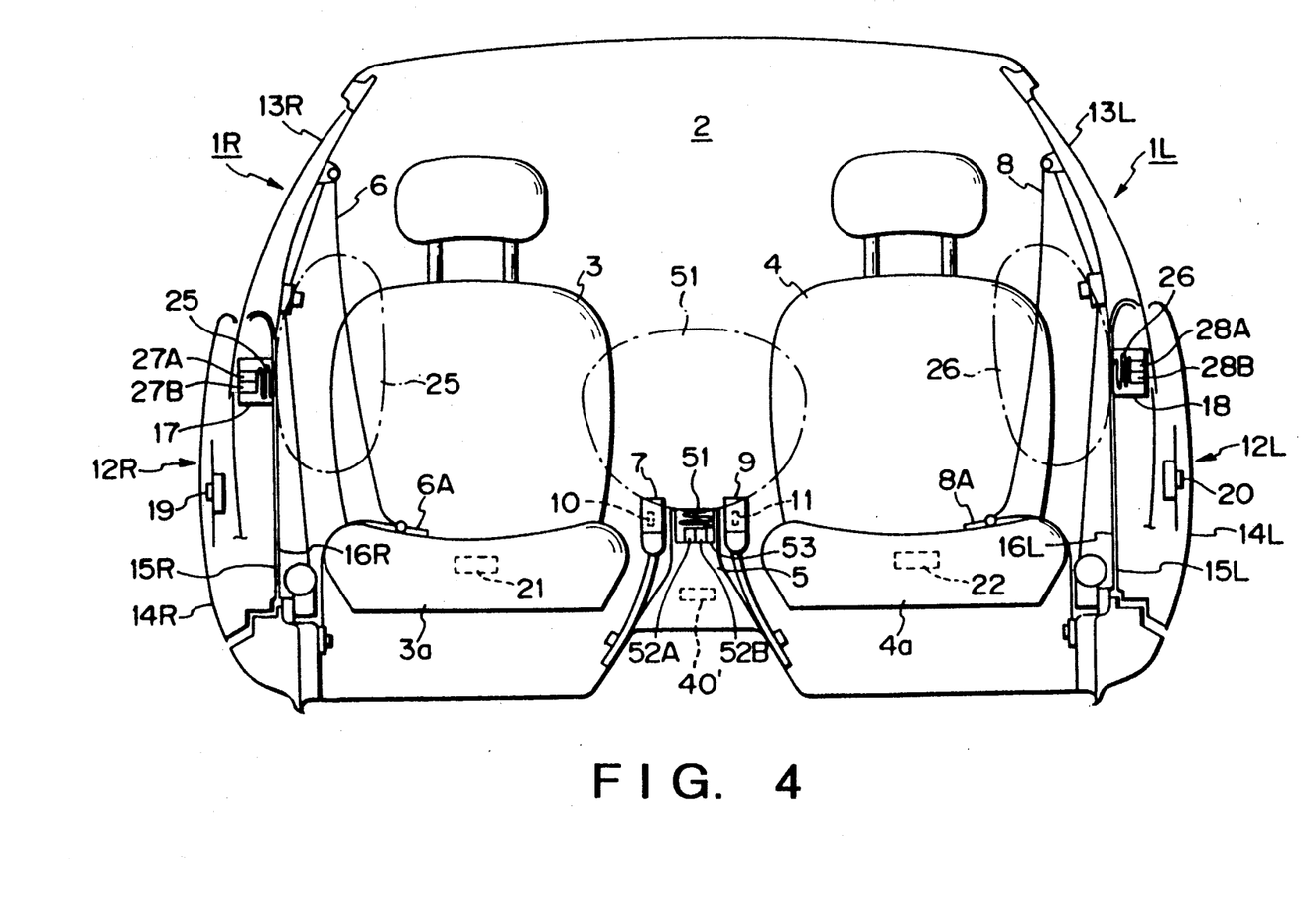
FIG. 4 is a schematic view showing door portions and a passenger room portion of a vehicle to which another embodiment of an energy absorbing apparatus for a vehicle body side portion according to the present invention is applied.
Figure 5:
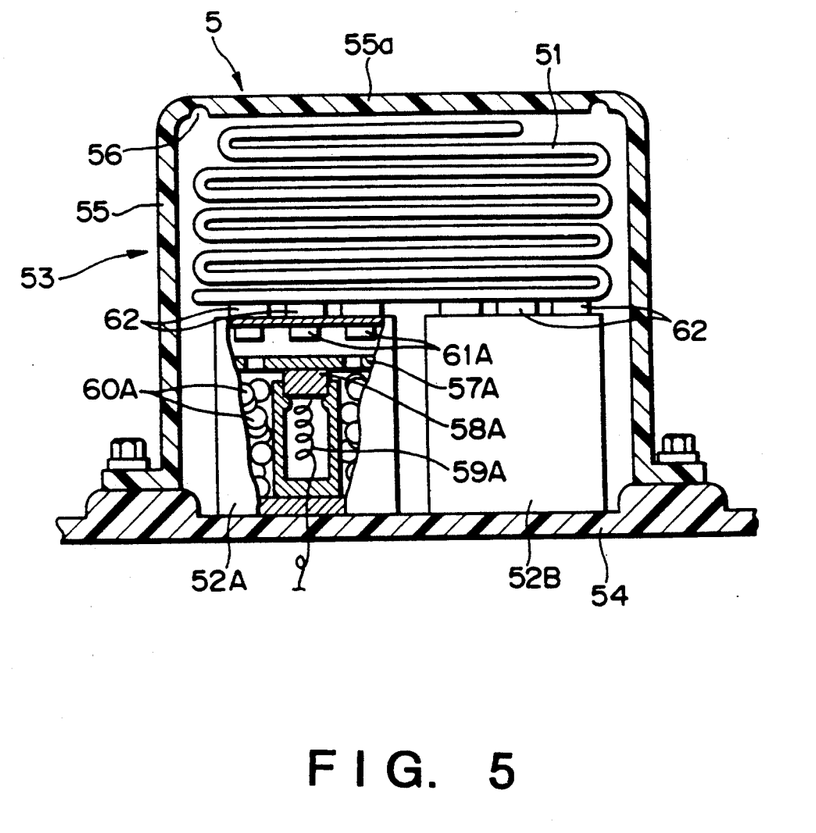
FIG. 5 is a longitudinal sectional view showing an internal structure of a center bag storage means of the energy absorbing apparatus shown in FIG. 4.
Figure 6:
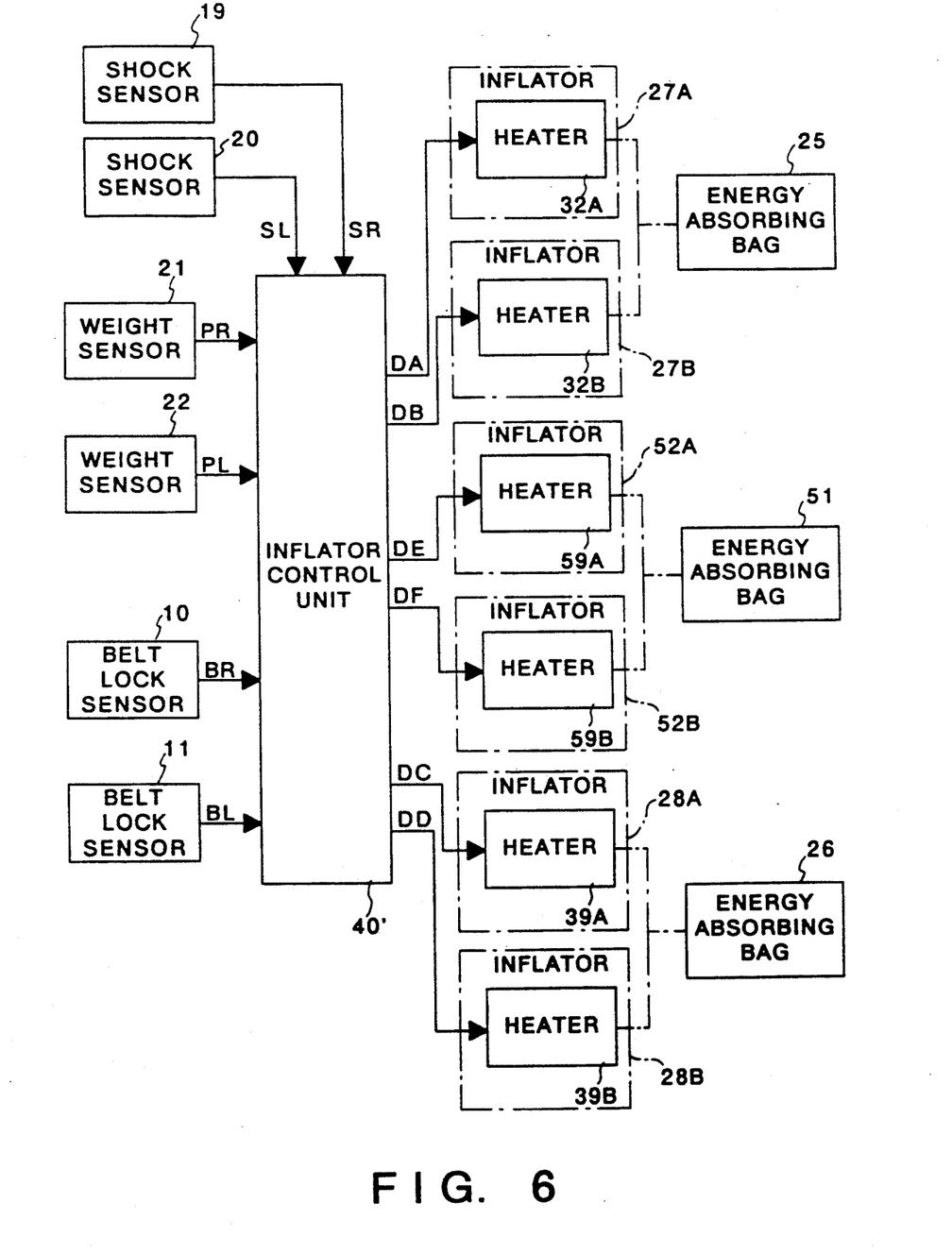
FIG. 6 is a block diagram showing electrical connections in the embodiment of the energy absorbing apparatus shown in FIG. 4.

In the embodiment described above, in order to protect passengers upon a side collision, the energy absorbing apparatus comprises the bag storage portions 17 and 18 in the right and left doors 1R and 1L, respectively. However, the present invention is not limited to this, but may be arranged as shown in FIGS. 4 through 6 as another embodiment. In the following description, the same reference numerals denote the same parts as in the embodiment described above, and a detailed description thereof will be omitted.

FIG. 4 is a schematic view showing door portions and a passenger room portion of a vehicle to which another embodiment of an energy absorbing apparatus for a vehicle body side portion according to the present invention is applied In the embodiment shown in FIG. 4, a bag storage portion 53 in which a folded energy absorbing bag 51, and two inflators 52A and 52B for inflating the energy absorbing bag 51 are arranged is stored in the upper portion of a center console box 5 arranged between right and left seats 3 and 4 in addition to bag storage portions 17 and 18 arranged in right and left doors 1R and 1L.

The bag storage portion 53 has a case 55 which stores the energy absorbing bag 51, and the two inflators 52A and 52B, and is fixed on a mounting plate portion 54 in the center console box 5 by fastening bolts, as shown in FIG. 5. The case 55 has a top plate portion 55a, and the top plate portion 55a faces the upper surface of the center console box 5. The top plate portion 55a is enclosed by a hinge portion 56a extending in the back-and-forth direction of the vehicle body, and a thin grooved portion 56b extending in a U shape with respect to the hinge portion 56a, and is partitioned from the remaining portion of the case 55 The thin grooved portion 56b can be broken by a relatively small tensile force.

The inflators 52A and 52B stored in the case 55 are fixed on the mounting plate portion 54. The folded energy absorbing bag 51 stored in the case 55 is arranged above the inflators 52A and 52B to be bridged over the two inflators. The distal end portion of the energy absorbing bag 51 faces the top plate portion 55a of the case 55. The inflators 52A and 52B have the same arrangement as the inflators 27A and 27B or 28A and 28B in the embodiment described above.

FIG. 5 shows the interior of only the inflator 52A. More specifically, the interior of the inflator 52A (or 52B) is partitioned into two rooms by a corresponding partition wall member 57A (or 57B) on which a large number of through holes are formed. One room partitioned by the partition wall member 57A (or 57B) stores an ignition agent 58A (or 58B), a heater 59A (or 59B) for igniting the ignition agent 58A (58B), and a gas generating agent 60A (or 60B) which is combusted when the ignition agent 58A (or 58B) is ignited, and generates a large amount of nitrogen gas. A plurality of filter portions 61A (or 61B) are arranged on one side wall portion of the other room to extend through the side wall portion. The plurality of filter portions 61A and 61B of the inflators 52A and 52B are coupled to a plurality of gas introduction ports 62 provided to the proximal end portion (i.e., the lower portion) of the folded energy absorbing bag 51 which is stored to be bridged above the inflators 52A and 52B.

In this manner, nitrogen gas generated in one of the two rooms partitioned by the partition wall member 57A (or 57B) of the inflator 52A (or 52B) is introduced to the other one of the two rooms partitioned by the partition wall member 57A (or 57B) via the through holes, and is filled in the energy absorbing bag 51 via the plurality of filter portions 61A (or 61B) and the plurality of gas introduction ports 62.

An inflator control unit 40' is arranged below the bag storage portion 53 in the center console box 5. As shown in FIG. 6, the inflator control unit 40' receives a shock sensing output signal SR from a shock sensor 19, a shock sensing output signal SL from a shock sensor 20, a sensing output signal PR output from a weight sensor 21, and representing a seating state of a passenger on the right seat 3, a sensing output signal PL output from a weight sensor 22, and representing a seating state of a passenger on the left seat 4, a sensing output signal BR output from a belt lock sensor 10, and representing a use state of a seat belt 6 by a passenger who is seated on the right seat 3, and a sensing output signal BL output from a belt lock sensor 11, and representing a use state of a seat belt 8 by a passenger who is seated on the left seat 4.

Upon reception of the shock sensing output signal SR or SL from the shock sensor 19 or 20, the inflator control unit 40' forms all or selected ones of a drive signal DA for a heater 32A of the inflator 27A in the bag storage portion 17, a drive signal DB for a heater 32B of the inflator 27B in the bag storage portion 17, a drive signal DC for a heater 39A of the inflator 28A in the bag storage portion 18, a drive signal DD for a heater 39B of the inflator 28B in the bag storage portion 18, a drive signal DE for the heater 59A in the inflator 52A in the bag storage portion 53, and a drive signal DF for the heater 59B in the inflator 52B in the bag storage portion 53 in accordance with the seating states of passengers on the right and left seats 3 and 4 sensed on the basis of the sensing output signals PR and PL from the weight sensors 21 and 22, and the use states of the seat belts 6 and 8 sensed on the basis of the sensing output signals BR and BL from the belt lock sensors 10 and 11, and supplies the formed signals to all or selected ones of the heater 32A of the inflator 27A, the heater 32B of the inflator 27B, the heater 39A of the inflator 28A, the heater 39B of the inflator 28B, the heater 59A of the inflator 52A, and the heater 59B of the inflator 52B.

In each of the inflators 52A and 52B in the central bag storage portion 53, when the drive signal DE or DF is supplied from the inflator control unit 40' to the corresponding heater 59A or 59B, the heater 59A or 59B immediately generates heat, thereby igniting the corresponding ignition agent 58A or 58B. Upon ignition of the ignition agent 58A or 58B, the gas generating agent 60A or 60B stored in the corresponding inflator 52A or 52B is combusted, and generates a large amount of nitrogen gas. The large amount of nitrogen gas generated in this manner passes through the filter portions 61A or 61B provided to the inflator 52A or 52B, and quickly flows into the energy absorbing bag 51 via the gas introduction ports 62, thereby inflating the energy absorbing bag 51.

Upon inflation, the energy absorbing bag 51 breaks the thin grooved portion 56b to pivot upward the top plate portion 55a of the case 55 about the hinge portion 56a, thereby opening an opening formed in the upper portion of the case 55. As a result, the central energy absorbing bag 51 is inflated upward via the opening, as indicated by an alternate long and short dashed line in FIG. 4.

In this case, when the drive signals DE and DF are simultaneously supplied to the heaters 59A and 59B of the inflators 52A and 52B, the energy absorbing bag 51 is inflated immediately. As a result, the energy absorbing bag 51 is immediately fully expanded. On the other hand, when the drive signal DE or DF is supplied to one of the heaters 59A and 59B of the inflators 52A and 52B, the energy absorbing bag 51 is relatively slowly inflated. As a result, the energy absorbing bag 51 is fully expanded at a delayed timing.

When the inflator control unit 40' supplies the drive signals DA, DB, DC, DD, DE, and DF, the relationship between the seating states of passengers on the right and left seats 3 and 4, and the use states of the seat belts 6 and 8 is set as follows. That is, when a shock caused by a side collision is applied to the vehicle body right side portion including the right door 1R, and the shock sensing output signal SR is obtained from the shock sensor 19, the above-mentioned relationship is set as shown in Table 5 below. On the other hand, when a shock caused by a side collision is applied to the vehicle body left side portion including the left door 1L, and the shock sensing output signal SL is obtained from the shock sensor 20, the above-mentioned relationship is set as shown in Table 6 below.

TABLE 5

| | (Shock on Vehicle Body Right Side Portion) | | | | | | | |
|---|---|---|---|---|---|---|---|---|
| Case | 1 | 2 | 3 | 4 | 5 | 6 | 7 | 8 |
| Right Seat 3 | Q | Q | Q | Q | Q | Q | E | E |
| Seat Belt 6 | N | U | N | U | N | U | N | N |
| Left Seat 4 | E | E | Q | Q | Q | Q | Q | Q |
| Seat Belt 8 | N | N | N | N | U | U | U | N |
| Drive Signal | | | | | | | | |
| DA | o | o | o | o | o | o | o | o |
| DB | o | o | o | o | o | o | o | o |
| DC | o | x | o | o | o | o | o | o |
| DD | o | x | o | x | x | x | x | x |
| DE | x | x | o | o | o | o | x | x |
| DF | x | x | o | o | o | x | x | x |

TABLE 6

| | (Shock on Vehicle Body Left Side Portion) | | | | | | | |
|---|---|---|---|---|---|---|---|---|
| Case | 1 | 2 | 3 | 4 | 5 | 6 | 7 | 8 |
| Right Seat 3 | Q | Q | Q | Q | Q | Q | E | E |
| Seat Belt 6 | N | U | N | U | N | U | N | N |
| Left Seat 4 | E | E | Q | Q | Q | Q | Q | Q |
| Seat Belt 8 | N | N | N | N | U | U | U | N |
| Drive Signal | | | | | | | | |
| DA | o | o | o | o | o | o | x | o |
| DB | x | x | o | x | x | x | x | o |
| DC | o | o | o | o | o | o | o | o |
| DD | o | o | o | o | o | o | o | o |
| DE | x | x | o | o | o | o | x | x |
| DF | x | x | o | o | o | x | x | x |

According to Tables 5 and 6 above, the drive signals DA and DB are supplied to the heaters 32A and 32B of the inflators 27A and 27B, the drive signals DC and DD are supplied to the heaters 39A and 39B of the inflators 28A and 38B, and the drive signals DE and DF are supplied to the heaters 59A and 59B of the inflators 52A and 52B, thus avoiding a situation that the energy absorbing bag which need not be inflated is undesirably inflated, as will be described below.

(a) When an external shock is applied to the vehicle body right side portion in a state wherein a passenger is seated on the right seat 3, and wears the seat belt 6, and no passenger is seated on the left seat 4 (i.e., Case 2 in Table 5), the energy absorbing bag 26 in the bag storage portion 18, and the energy absorbing bag 51 in the bag storage portion 53 are inhibited from being inflated.

(b) When an external shock is applied to the vehicle body right side portion in a state wherein a passenger (driver) is seated on the right seat 3, and does not wear the seat belt 6, and no passenger is seated on the left seat 4 (i.e., Case 1 in Table 5), the energy absorbing bag 51 in the ba storage portion 53 is inhibited from being inflated.

(c) When an external shock is applied to the vehicle body right side portion in a state wherein no passenger is seated on the right seat 3, and a passenger is seated on the left seat 4 and does not wear the seat belt 8 (i e., Case 8 in Table 5), the energy absorbing bag 51 in the bag storage portion 53 is inhibited from being inflated.

(d) When an external shock is applied to the vehicle body right side portion in a state wherein no passenger is seated on the right seat 3, and a passenger is seated on the left seat 4 and wears the seat belt 8 (i.e., Case 7 in Table 5), the energy absorbing bag 51 in the bag storage portion 53 is inhibited from being inflated.

(e) When an external shock is applied to the vehicle body left side portion in a state wherein a passenger is seated on the left seat 4 and wears the seat belt 8, and no passenger is seated on the right seat 3 (i.e., Case 7 in Table 6), the energy absorbing bag 25 in the bag storage portion 17, and the energy absorbing bag 51 in the bag storage portion 53 are inhibited from being inflated.

(f) When an external shock is applied to the vehicle body left side portion in a state wherein a passenger is seated on the left seat 4 and does not wear the seat belt 8, and no passenger is seated on the right seat 3 (i.e., Case 8 in Table 6), the energy absorbing bag 51 in the bag storage portion 53 is inhibited from being inflated.

(g) When an external shock is applied to the vehicle body left side portion in a state wherein no passenger is seated on the left seat 4, and a passenger is seated on the right seat 3 and does not wear the seat belt 6 (i.e., Case 1 in Table 6), the energy absorbing bag 51 in the bag storage portion 53 is inhibited from being inflated.

(h) When an external shock is applied to the vehicle body left side portion in a state wherein no passenger is seated on the left seat 4, and a passenger is seated on the right seat 3 and wears the seat belt 6 (i.e., Case 2 in Table 6), the energy absorbing bag 51 in the bag storage portion 53 is inhibited from being inflated.

In this manner, a situation that the energy absorbing bag which need not be inflated is undesirably inflated can be avoided, and the energy absorbing bags 25, 26, and 51 in the bag storage portions 17, 18, and 53 can be inflated at appropriate inflation speeds in accordance with the seating states of passengers on the right and left seats 3 and 4, and the use states of the seat belts 6 and 8.

As can be apparent from the above description, according to the energy absorbing apparatus for a vehicle body side portion according to the present invention, when an external shock is applied to the vehicle body side portion, the energy absorbing bag is inflated from the vehicle body side portion into the passenger room, and the shock energy is absorbed by the inflated energy absorbing bag, thereby reducing the influence of the shock on passengers in the passenger room. In this case, the seating states of passengers on seats arranged on the passenger room, and the use states of the seat belts equipped on the seats are sensed when the external shock is applied to the vehicle body side portion, and an inflation mode of the energy absorbing bag to be inflated is set in accordance with the sensed seating states of the passengers, and the sensed use states of the seat belts. Thus, the bag inflating means for the selected energy absorbing bag is operated in accordance with the set inflation mode. As a result, since the energy absorbing bag is inflated in accordance with the seating states of the passengers and the use states of the seat belts, the inflation state of the energy absorbing bag suitable for a condition in the passenger room upon application of the external shock to the vehicle body side portion can be obtained, thus guaranteeing protection of passengers. Furthermore, unnecessary operation noise generated by an energy absorbing bag which need not be inflated in terms of protection of passengers can be prevented, and an undesirable increase in nitrogen gas concentration in the passenger room caused by, e.g., nitrogen gas degassed from the energy absorbing bag which need not be inflated through degassing holes can also be prevented.

As many apparently widely different embodiments of the present invention can be made without departing from the spirit and scope thereof, it is to be understood that the invention is not limited to the specific embodiments thereof except as defined in the appended claims.

What is claimed is:

1. A body side mounted air bag control system comprising:
   (a) first bag storage means, arranged in a vehicle body left side portion on a passenger room side, for storing a folded first energy absorbing bag;
   (b) first bag inflating means, arranged in said first bag storage means, for inflating said first energy absorbing bag;
   (c) second bag storage means, arranged in a vehicle body right side portion of the passenger room side, for storing a folded second energy absorbing bag;
   (d) second bag inflating means, arranged in said second bag storage means, for inflating said second energy absorbing bag;
   (e) first shock sensor means for sensing an external shock applied to the vehicle body left side portion;
   (f) second shock sensor means for sensing an external shock applied to the vehicle body right side portion;
   (g) seating state sensor means for sensing seating states of passengers on seats arranged in the passenger room;
   (h) belt used state sensor means for sensing use states of seat belts equipped on the seats; and
   (i) control means for controlling operations of said first and second bag inflating means, when a shock sensing output signal is obtained from one of said first and second shock sensor means, said control means operates one or both of said first and second bag inflating means in accordance with an operation mode according to the seating states of passengers represented by a sensing output signal obtained from said seating state sensor means, and the use states of the seat belts represented by a sensing output signal obtained from said belt use state sensor means so as to inflate one or both of said first and second energy absorbing bags in accordance with the seating states of passengers and the use states of the seat belts, and when the shock sensing output signal is obtained from one of said first and second shock sensor means, said control means further includes
      (i-1) a basic control mode for controlling to operate both said first and second bag inflating means so as to inflate both said first and second energy absorbing ; and
      (i-2) an exceptional control mode for, when it is sensed that a passenger is seated on a collision side and the belt is used, and no passenger is seated on the seat on a side opposite to the collision side, controlling to operate the bag inflating means on the collision side, and not to operate the bag inflating means on the side opposite to the collision side so as to inflate only the energy absorbing bag on the collision side, and
   wherein the basic control mode of said control means includes
   a first basic control mode for controlling to quickly operate the bag inflating means on the collision side so as to immediately fully expand the energy absorbing bag on the collision side; and
   a second basic control mode for, when it is sensed that a passenger is seated on a collision side and the belt is not used and no passenger is seated on the seat on a side opposite to the collision side, or when it is sensed that passengers are seated on the collision side and on the side opposite to the collision side and the belts are not used, controlling to quickly operate the bag inflating means on the side opposite to the collision side so as to immediately fully expand the energy absorbing bag on the side opposite to the collision side.

2. The system according to claim 1, wherein the basic control mode of said control means further comprises:
   a third basic control mode for controlling to slowly operate the bag inflating means on the side opposite to the collision side so as to fully expand the energy absorbing bag on the side opposite to the collision side in a delayed state with the second basic control mode as an exceptional mode.

3. A body side mounted air bag control system comprising:
   (a) first bat storage means, arranged in a vehicle body left side portion on a passenger room side, for storing a folded first energy absorbing bag;
   (b) first bag inflating means, arranged in said first bag storage means, for inflating said first energy absorbing bag;
   (c) second bag storage means, arranged in a vehicle body right side portion on the passenger room side, for storing a folded second energy absorbing bag;
   (d) second bag inflating means, arranged in said second bag storage means, for inflating said second energy absorbing bag;
   (e) first shock sensor means for sensing an external shock applied to the vehicle body left side portion;
   (f) second shock sensor means for sensing an external shock applied to the vehicle body right side portion;
   (g) seating state sensor means for sensing seating states of passengers on seats arranged in the passenger room;
   (h) belt use state sensor means for sensing use states of seat belts equipped on the seat; and
   (i) control means for controlling operations of said first and second bag inflating means, when a shock sensing output signal is obtained from one of said first and second shock sensor means, said control means operates one or both of said first and second bag inflating means in accordance with an operation mode according to the seating states of passengers represented by a sensing output signal obtained from said seating state sensor means, and the use states of the seat belts represented by a sensing output signal obtained from said belt use state sensor means so as to inflate one or both of said first and second energy absorbing bags in accordance with the seating states of passengers and the use states of the seat belts, and when the shock sensing output signal is obtained from one of said first and second shock sensor means, said control means further includes
      (i-1) a basic control mode for controlling to operate both said first and second bag inflating means so as to inflate both said first and second energy absorbing bags;
      (i-2) a first exceptional control mode for, when it is sensed that a passenger is seated on the seat on the collision side and the belt is used, and no passenger is seated on the seat on the side opposite to the collision side, controlling to operate the bag inflating means on the collision side, and not to operate the bag inflating means on the side opposite to the collision sides so as to inflate only the energy absorbing bag on the collision side; and (i-3) a second exceptional control mode for, when it is sensed that a passenger is seated on the seat on the side opposite to the collision side and the belt is used, and no passenger is seated on the seat on the collision side, controlling to operate the bag inflating means on the side opposite to the collision side, and not to operate the bag inflating means on the collision side so as to inflate the energy absorbing bag on the side opposite to the collision side; and wherein the basic control mode of said control means includes a first basic control mode for, when it is sensed that a passenger is seated on the seat on the side opposite to the collision side and the belt is not used, and no passenger is seated on the seat on the collision side, controlling to slowly operate the bag inflating means on the collision side so as to fully expand the energy absorbing bag on the collision side in a delayed state.

4. The system according to claim 3, wherein the basic control mode of said control means further comprises:

a second basic control mode for controlling to quickly operate the bag inflating means on the collision side so as to immediately fully expand the energy absorbing bag on the collision side with the first control mode as an exceptional mode.

5. The system according to claim 3, wherein the basic control mode of said control means further comprises:

a second basic control mode for, when it is sensed that a passenger is seated on the seat on the collision side and the belt is not used, and no passenger is seated on the seat on the side opposite to the collision side, or when it is sensed that passengers are seated on the seats on the collision side and on the side opposite to the collision side and the belts are not used, controlling to quickly operate the bag inflating means on the side opposite to the collision side so as to immediately fully expand the energy absorbing bag on the side opposite to the collision side.

6. The system according to claim 3, wherein the basic control mode of said control means further comprises:

a second basic control mode for controlling to slowly operate the bag inflating means on the side opposite to the collision side so as to fully expand the energy absorbing bag on the side opposite to the collision side in a delayed state.

7. A body side mounted air bag control system comprising:

(a) first bag storage means, arranged in a vehicle body left side portion on a passenger room side, for storing a folded first energy absorbing bag;

(b) first bag inflating means, arranged in said first bag storage means, for inflating said first energy absorbing bag;

(c) second bag storage means, arranged in a vehicle body right side portion on the passenger room side, for storing a folded second energy absorbing bag;

(d) second bag inflating means, arranged in said second bag storage means, for inflating said second energy absorbing bag;

(e) third bag storage means, arranged at a substantially central portion in a widthwise direction of the passenger room for storing a folded third energy absorbing bag;

(f) third bag inflating means, arranged in said third bag storage means, for inflating said third energy absorbing bag;

(g) first shock sensor means for sensing an external shock applied to the vehicle body left side portion;

(h) second shock sensor means for sensing an external shock applied to the vehicle body right side portion;

(i) seating state sensor means for sensing seating states of passengers on seats arranged in the passenger room;

(j) belt use state sensor means for sensing use states of seat belts equipped on the seats; and (k) control means for controlling operations of said first through third bag inflating means, and when a shock sensing output signal is obtained from one of said first and second shock sensor means, said control means operates at least one of said first through third bag inflating means in accordance with an operation mode according to the seating states of passengers represented by a sensing output signal obtained from said seating state sensor means, and the use states of the seat belts represented by a sensing output signal obtained from said belt use state sensor means so as to inflate at least one of said first through third energy absorbing bags in accordance with the seating states of passengers and the use states of the seat belts, wherein when the shock sensing output signal is obtained from one of said first and second shock sensor means, said control means includes (k-1) a basic control mode for controlling to operate said first through third bag inflating means so as to inflate said first through third energy absorbing bags;

(k-2) a first exceptional control mode for, when it is sensed that a passenger is seated on the seat on the collision side and the belt is used, and no passenger is seated on the seat on the side opposite to the collision side, controlling to operate the bag inflating means on the collision side, and not to operate the bag inflating means on the side opposite to the collision side so as to inflate only the energy absorbing bag on the collision side; and (k-3) a second exceptional control mode for, when it is sensed that a passenger is seated on only one of the seats on the collision side and on the side opposite to the collision side, controlling not to operate said third bag inflating means so as not to inflate said third energy absorbing bag.

8. A body side mounted air bag control system comprising:

(a) first bag storage means, arranged in a vehicle body left side portion on a passenger room side, for storing a folded first energy absorbing bag;

(b) first bag inflating means, arranged in said first bag storage means, for inflating said first energy absorbing bag;

(c) second bag storage means, arranged in a vehicle body right side portion on the passenger room side, for storing a folded second energy absorbing bag;

(d) second bag inflating means, arranged in said second bag storage means, for inflating said second energy absorbing bag;

(e) first shock sensor means for sensing an external shock applied to the vehicle body left side portion;

(f) second shock sensor means for sensing an external shock applied to the vehicle body right side portion;
(g) seating state sensor means for sensing seating states of passengers on seats arranged in the passenger room;
(h) belt use state sensor means for sensing use states of seat belts equipped on the seats; and
(i) control means for controlling operations of said first and second bag inflating means, and when a shock sensing output signal is obtained from one of said first and second shock sensor means, said control means operates one or both of said first and second bag inflating means in accordance with an operation mode according to the seating states of passengers represented by a sensing output signal obtained from said seating state sensor means, and the use states of the seat belt represented by a sensing output signal obtained from said belt use state sensor means so as to inflate one or both of said first and second energy absorbing bags in accordance with the seating states of passengers and the use states of the seat belts and when the shock sensing output signal is obtained from one of said first and second shock sensor means, said control means further includes
(i-1) a basic control mode for controlling to operate both said first and second bag inflating means so as to inflate both said first and second energy absorbing bags; and
(i-2) an exceptional control mode for, when it is sensed that a passenger is seated on a collision side and the belt is used, and no passenger is seated on the seat on a side opposite to the collision side, controlling to operate the bag inflating means on the collision side, and not to operate the bag inflating means on the side opposite to the collision side so as to inflate only the energy absorbing bag on the collision side,
and wherein the basic control mode of said control means includes
a first basic control mode for, when it is sensed that a passenger is seated on a collision side and the belt is not used, and no passenger is seated on the seat on a side opposite to the collision side, or when it is sensed that passengers are seated on the collision side and on the side opposite to the collision side and the belts are not used, controlling to quickly operate the bag inflating means on the side opposite to the collision side so as to immediately fully expand the energy absorbing bag on the side opposite to the collision side; and
a second basic control mode for controlling to slowly operate the bag inflating means on the side opposite to the collision side so as to fully expand the energy absorbing bag on the side opposite to the collision side in a delayed state when the first basic control mode as an exceptional mode.

* * * * *

UNITED STATES PATENT AND TRADEMARK OFFICE
CERTIFICATE OF CORRECTION

PATENT NO. : 5,172,790
DATED : 12/22/92
INVENTOR(S) : Ishikawa et al.

It is certified that error appears in the above-identified patent and that said Letters Patent is hereby corrected as shown below:

Col. 12, line 60, after "applied" insert --.--.

Col. 13, line 12, after "55" insert --.--.

Col. 15, line 52, "ba" should be --bag--.

Col. 18, line 16 (claim 3), "bat" should be --bag--; line 68, "sides" should be --side--.

Col. 19, line 67 (claim 7), after "room" insert --,--.

Col. 21, line 23 (claim 8), after "belts" insert --,--.

Col. 22, line 29 (claim 8), "when" should be --with--.

Signed and Sealed this

Fourteenth Day of December, 1993

BRUCE LEHMAN

*Attest:*

*Attesting Officer*  *Commissioner of Patents and Trademarks*